United States Patent [19]

Vogel

[11] Patent Number: 5,348,280

[45] Date of Patent: Sep. 20, 1994

[54] APPARATUS FOR ALIGNING MULTILATERAL TUBE SECTIONS

[75] Inventor: Victor J. Vogel, Oak Ridge, N.J.

[73] Assignee: Mosler, Inc., Wayne, N.J.

[21] Appl. No.: 37,251

[22] Filed: Mar. 26, 1993

[51] Int. Cl.$^5$ .............................................. B23Q 3/14
[52] U.S. Cl. .................................... 269/48.1; 29/272; 228/49.3
[58] Field of Search ................ 228/49.3, 44.5; 29/271, 29/272; 269/43, 48.1; 279/2.16

[56] References Cited

U.S. PATENT DOCUMENTS

| | | | |
|---|---|---|---|
| 3,366,343 | 1/1968 | Messamer et al. | 269/48.1 |
| 3,601,387 | 8/1971 | Pavlich | 269/48.1 |
| 3,979,041 | 9/1976 | Kaneyama et al. | 228/49.3 |
| 4,582,241 | 4/1986 | Johnson | 269/48.1 |

Primary Examiner—Robert C. Watson
Attorney, Agent, or Firm—Wood, Herron & Evans

[57] ABSTRACT

An alignment tool for aligning the internal surfaces of multilateral tube sections to be joined. The alignment tool includes aligning members connected to toggle links which are in turn connected to a toggle actuator. The toggle actuator is effective to push a first area of bearing surfaces on the aligning members into contact with internal surfaces of the first tube section. The toggle actuator is locked into position in the first tube section. Internal surfaces of a second tube section are slid over exposed second areas of the bearing surfaces of the aligning members thereby aligning the first and second tube sections. The tube sections are connected; the aligning members are moved away from the internal surfaces and the alignment tool is removed.

10 Claims, 3 Drawing Sheets

APPARATUS FOR ALIGNING MULTILATERAL TUBE SECTIONS

BACKGROUND OF THE INVENTION

1. Field of the Invention

The present invention relates to an alignment tool, and more particularly to an alignment tool, construction and method of using the tool to align the internal surfaces of multilateral tube sections prior to connecting the tube sections together.

2. Background of the Invention

Pneumatic transport systems utilize a carrier moving inside a tube in response to pneumatic forces applied to the carrier. Typically, such systems utilize a removable cylindrical carrier moving inside a cylindrical tube. In some applications, oval carriers with mating oval transport tubes may be used. In either of the above situations, commercially available cylindrical and oval tube sections generally contain integral flanges which are effective for aligning the internal cylindrical surfaces of the tube sections. Consequently, when the tube sections are bolted together or otherwise rigidly connected, the flanges are effective to align the tube sections thereby providing a smooth transition between the internal surfaces of the tube sections. That alignment is necessary to maintain the integrity of the pneumatic seal between the carrier and the internal surface of the tube.

Some pneumatic transport systems utilize a transport tube having a multilateral cross-section which is quadrilateral, such as a square or rectangular. Maintaining a proper pneumatic seal between a multilateral carrier having external corners and a matching multilateral transport tube section is more difficult than with a circular carrier and tube section. The alignment of the internal surfaces and corners of multilateral tube sections is very critical in maintaining the integrity of the seal between a multilateral carrier and its mating tube section. However, generally multilateral tube sections are not available with integral tube aligning mechanisms.

Typically, the multilateral tube sections contain outwardly extending flanges at the ends thereof, and the flanges of adjoining tube sections are bolted together to rigidly connect the tube sections. The multilateral tube sections may range in lengths of from 3 meters to 8 meters, and a number of tube sections may be joined together over a length of up to several hundred meters. The long tube sections are relatively awkward to manipulate and handle. Further, the manufacturing tolerances of the bolt holes in the flanges of the tube sections do not permit the tube sections to be adequately aligned by simply aligning those bolt holes. Therefore, multilateral tube sections do not have any means for aligning their internal surfaces when the tube sections are connected end-to-end.

SUMMARY OF THE INVENTION

To overcome the absence of a means of aligning multilateral pneumatic tube sections, the invention provides an alignment tool that facilitates connecting multilateral tube sections by aligning the internal surfaces of adjoining sections.

According to the principles of the present invention and in accordance with the presently preferred embodiment, an alignment tool has aligning corner members slidably mounted on a frame. Each of the aligning members is pivotally connected to one end of a toggle link. The other end of each toggle link is pivotally connected to a centrally located toggle actuator. The alignment tool is partially inserted into one end of a multilateral tube section. The toggle actuator is moved toward the frame thereby sliding the aligning members into contact with the internal surfaces of the tube section so that an area of the bearing surfaces on the aligning members is in contact with the internal surfaces of the tube section. Therefore, the areas of the bearing surfaces not in contact with internal surfaces extend out beyond the end of the tube section. The toggle actuator is moved over-center to a lockover position against the frame thereby locking the toggle in its extended position and securing it in the one end of the tube section. One end of another tube section is moved over the areas of the bearing surfaces extending beyond the ends of the first tube section thereby aligning the internal surfaces of the two tube sections. The tube sections are then bolted together with their internal surfaces held in alignment by the alignment tool. The toggle actuator is moved away from the frame thereby moving the aligning members away from the internal surfaces of the tube sections. The alignment tool is then removed from the joined tube sections. In addition to the alignment tool construction, the present invention further includes the above described method of using the alignment tool to connect multilateral tube sections.

An advantage of the present invention is that multilateral tube sections may be rigidly connected after aligning the internal surfaces of those tube sections thereby maintaining a smooth transition between internal surfaces of the tube sections and preserving the integrity of a subsequent pneumatic seal between the tube sections and the carrier contained therein.

These and other objects and advantages of the present invention will become more readily apparent during the following detailed description taken in conjunction with the drawings herein.

DETAILED DESCRIPTION OF THE INVENTION

Figure 1:
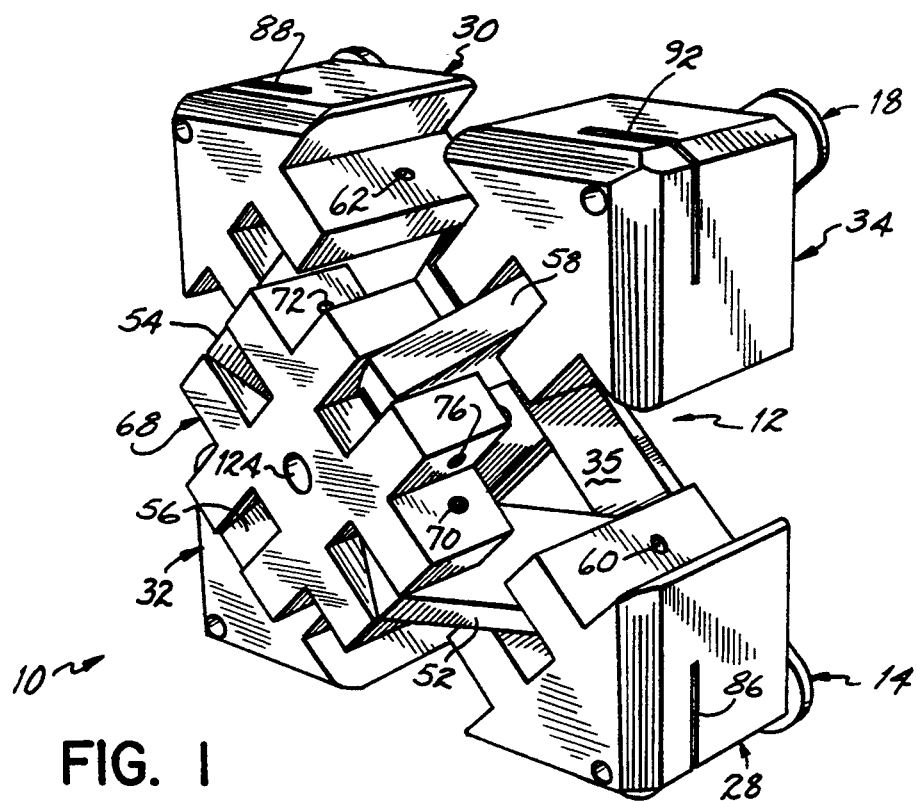
FIG. 1 is a front perspective view of the alignment tool of the present invention.
Figure 2:
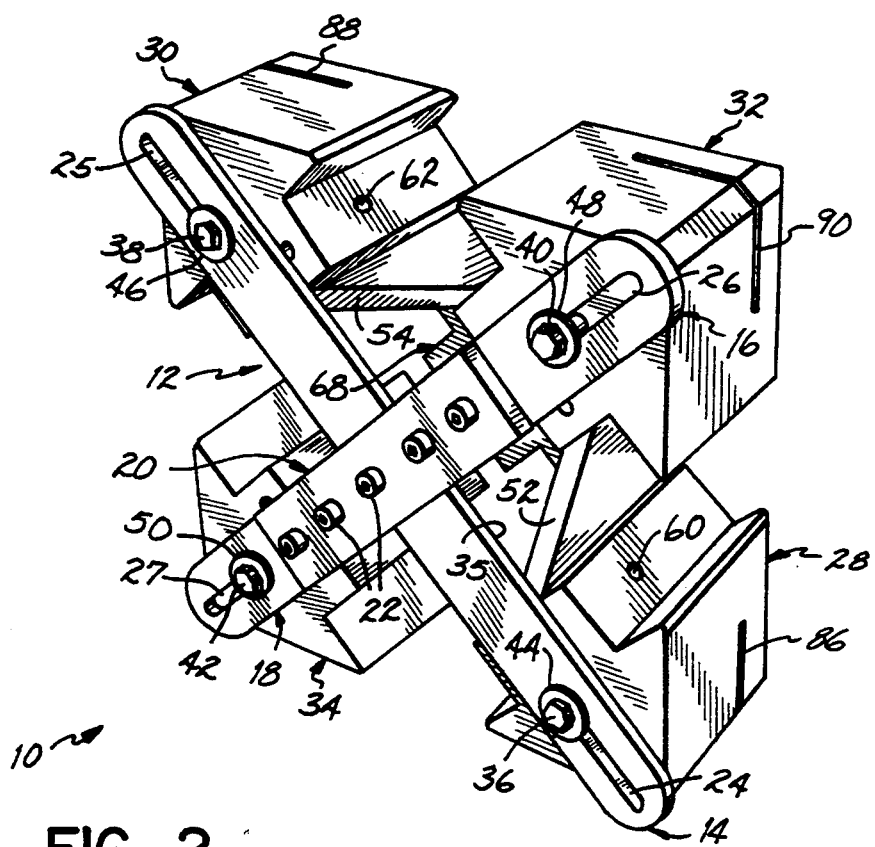
FIG. 2 is a rear perspective view of the alignment tool of the present invention.
Figure 5:
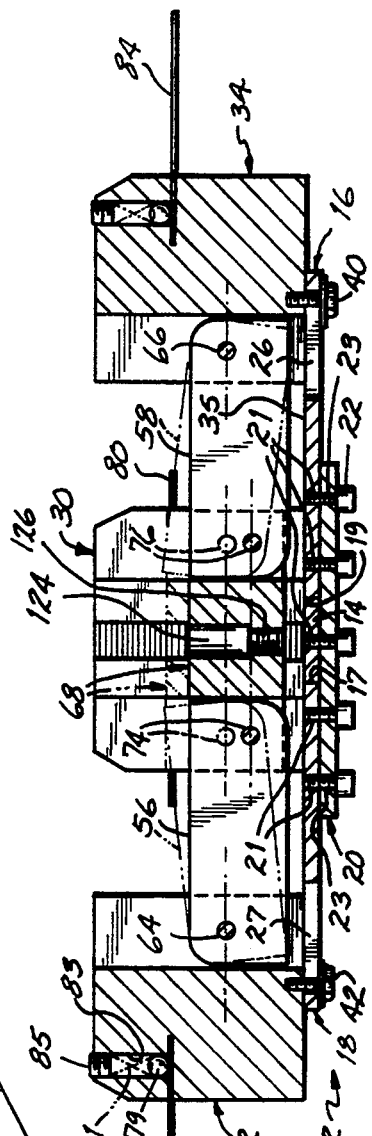
FIG. 5 is a centerline cross-sectional view of the alignment tool in its extended position and illustrating the over-center locked position of the toggle actuator.

FIGS. 1, 2 and 5 illustrate the construction of the alignment tool of the present invention. The alignment tool 10 has a frame 12 comprised of a full cross brace 14 and two partial cross braces 16 and 18. The partial cross braces 16 and 18 are oriented in generally the same plane as the full cross brace 14 but are oriented perpendicular to the full cross brace 14. As shown in FIG. 5, opposing ends 17, 19 of the respective cross braces 16, 18 are spaced apart by the width of the full cross brace 14 therebetween. A cross brace strap 20 is centered over the full cross brace 14, and the ends of the cross brace strap 20 extend over the partial cross braces 16 and 18. The full cross brace 14 and partial cross braces 16 and 18 contain threaded holes 21 which receive threaded fasteners 22 passing through clearance holes 23 in the cross brace strap 20. Therefore the cross braces 14, 16, 18 and cross brace strap 20 form the rigid frame assembly 12.

The full cross brace 14 contains slots 24 and 25 at its outwardly extending ends, and the outwardly extending ends of the partial cross braces 16 and 18 contain slots 26 and 27. Aligning members 28, 30, 32 and 34 are slidably mounted to one side 35 of the frame 12 relative to slots 24, 25, 26 and 27, respectively. Threaded fasteners 36, 38, 40 and 42 have washers 44, 46, 48 and 50, respectively, which extend beyond the sides of the slots 24, 25, 26 and 27. The threaded fasteners 36, 38, 40 and 42 are threaded into their respective aligning members and secured in the aligning members, such that, the aligning members are free to slide in their respective slots in a direction parallel to the longitudinal axes of the cross braces.

The aligning members 28, 30, 32 and 34 are pivotally connected to one end of respective toggle links 52, 54, 56 and 58 so that the one end of each respective toggle link 52, 54, 56 and 58 pivots with respect to its respective aligning member about respective first pivot pins 60, 62, 64 and 66. The opposite end of each toggle link 52, 54, 56 and 58 is pivotally connected to a toggle actuator 68 by second pivot pins 70, 72, 74 and 76, respectively.

Figure 3:
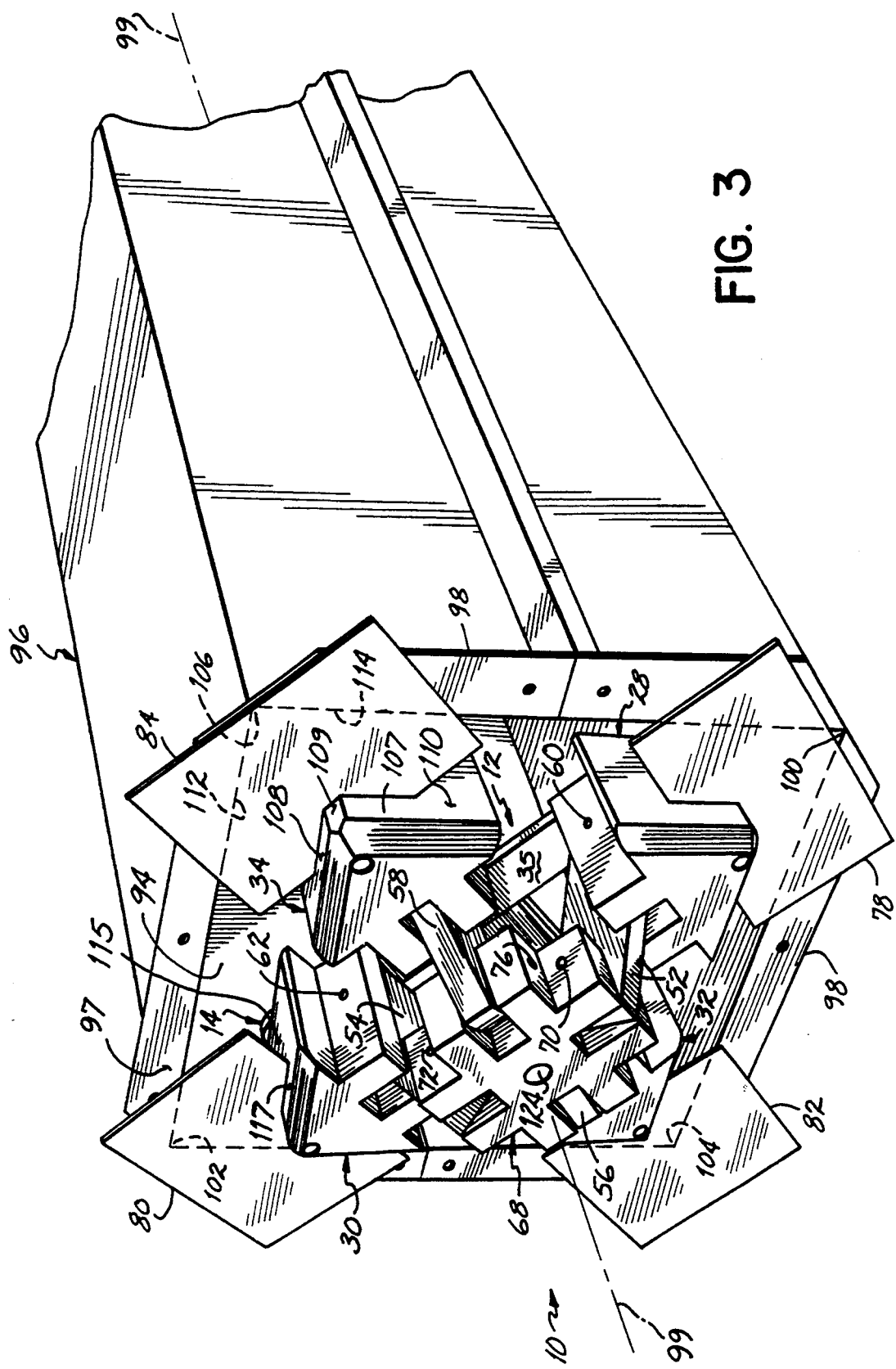
FIG. 3 is a perspective view of the alignment tool in its collapsed configuration inserted in one end of a transport tube section.
Figure 4:
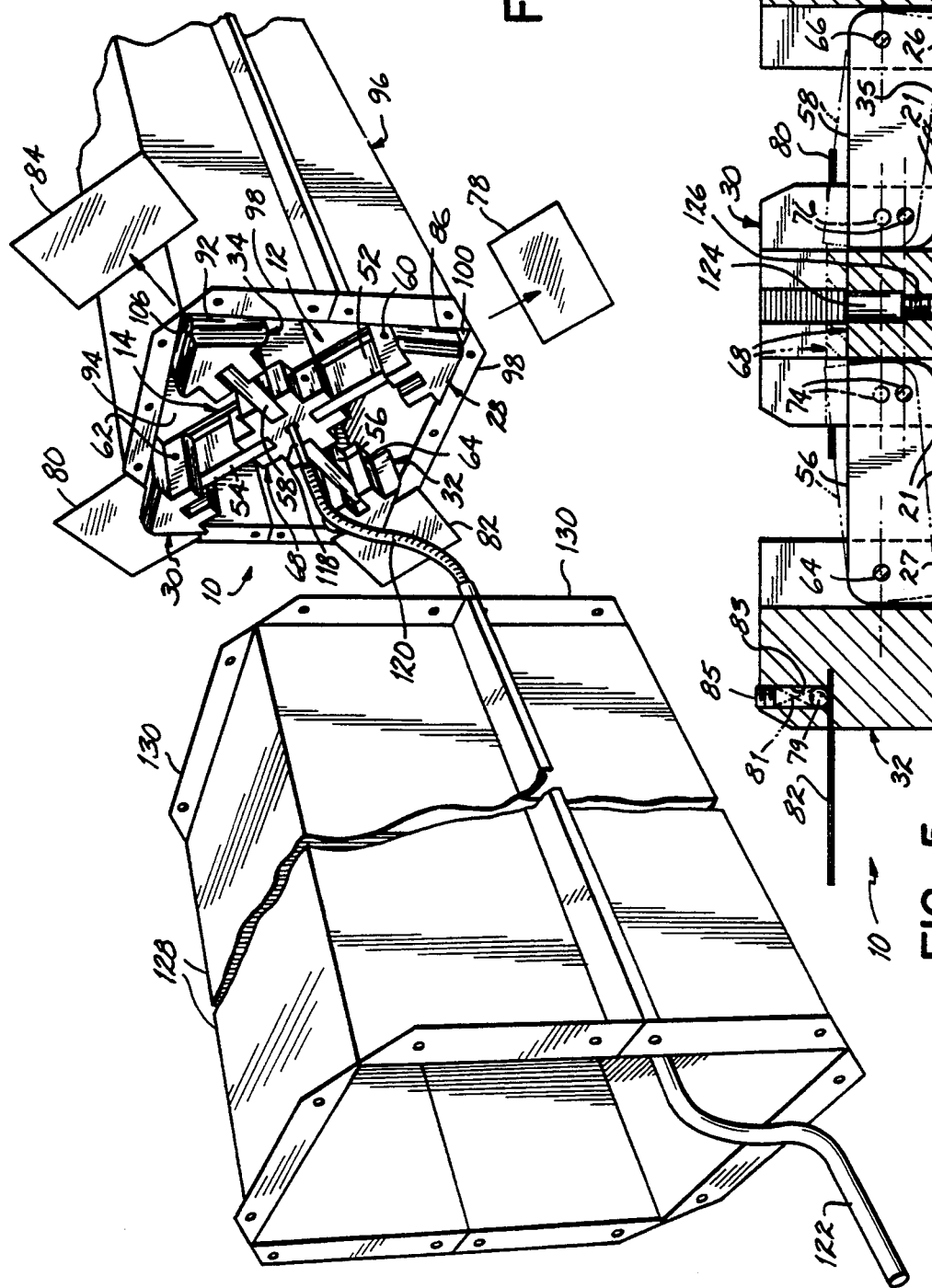
FIG. 4 is a perspective view of the alignment tool extended into the internal corners of one section of a transport tube.

FIGS. 3, 4 and 5 illustrate how the alignment tool is used to align the internal corners of tube sections to be connected. As shown in FIG. 3, removable stop members 78, 80, 82 and 84 are located in slots 86, 88, 90 and 92 of aligning members 28, 30, 32 and 34, respectively. As exemplified in FIG. 5 with respect to aligning member 32, the stop member 82 is held in the slot by a ball, or detent, 79 applying a force from a compression spring 81 held in a bore 83 by a screw 85. The force is effective to hold the stop member in the slot but does not prohibit the stop member from being removed from the slot. The other stop members are removably mounted to their respective aligning members 28, 30, 34 by identical means. In FIG. 3, the alignment tool is shown in its collapsed position in which the aligning members are located at their innermost position with respect to the actuator 68. In that position, the second pivot axes 70, 72, 74 and 76 are located a greater distance from the one side 35 of the frame 12 than the first pivot axes 60, 62, 64 and 66.

In a collapsed configuration as shown in FIG. 3, the alignment tool may be readily inserted within the interior volume 94 of one end of a first transport tube section 96. The alignment tool 10 is pushed into the tube section 96 until the stop members 78, 80, 82 and 84 contact a peripheral end surface 97 of an outwardly extending flange 98 extending around the perimeter of the tube section 96. The tube section 96 is manufactured such that the peripheral end surface 97 of flange 98 is perpendicular to the a central longitudinal perpendicular axis 99 of the tube section 96. Therefore, when all of the stop members are in contact with the flange 98, the stop members 78, 80, 82 and 84 are in a plane perpendicular to the central longitudinal axis 99 of the tube section 96. The stop members 78, 80, 82 and 84 align the alignment tool 10 with the tube section 96 such that the central axis of the alignment tool is parallel to the central longitudinal axis of the tube section, and the alignment tool is square with the sides of the tube section 96. After the alignment tool properly positioned with respect to the tube section 96, actuator 68 is moved toward the one side 35 of the frame 12 which causes the toggle links 52, 54, 56 and 58 to move their respective aligning members away from the actuator 68 and toward the outwardly extending ends of the cross braces 14, 16 and 18. The toggle actuator 68 is moved in the same direction toward the one side of the frame 12 until the aligning members 28, 30, 32 and 34 contact the surfaces forming the internal corners 100, 102, 104 and 106 of the tube section 96.

As shown in FIG. 3 with reference to aligning member 34, the nose 107 of aligning member 34 has a chamfer 109 connecting first and second bearing surfaces 108 and 110 which contact the internal surfaces 112 and 114, respectively, forming the included corner 106 of the tube section. The contact between the bearing surfaces 108, 110 and the internal surfaces 112, 114 forming the included corner 106 results in the aligning member 34 centering itself in the internal corner 106. The geometric configuration of the other aligning members is identical, and they also center themselves in their respective corners. The geometric configuration of the nose of the aligning members is generally triangular. Therefore, the slots 86, 88, 90, and 92 are cut into both bearing surfaces of each of the respective aligning members, thereby dividing the bearing surfaces into first and second areas, for example, a first area 115 and a second area 117 shown with respect to aligning member 30 in FIG. 3. The stop members 78, 80, 82 and 84 extend perpendicularly from the bearing surfaces of their respective aligning members 28, 30, 32 and 34. The aligning members may have other nose geometries such as, for example, a hemispherical or ball-shaped surface so that there is a self-centering point contact between the hemispherical ball and the internal surfaces of the included corner. A semi-cylindrical shaped nose on a aligning member would provide line contact with each sidewall of the internal corner and would also be effective to center the aligning member within the internal corner of the tube section.

After the aligning members are in contact with the internal surfaces of the tube section, the toggle actuator 68 is moved further toward the frame 14 until the first pivot axes 60, 62, 64 and 66 are coplanar with the second pivot axes 70, 72, 74 and 76, as shown in phantom in FIG. 5. At that position, the aligning members 28, 30, 32 and 34 have the greatest displacement from the actuator 68 and are exerting the maximum possible force against the internal surfaces of the transport tube section. The toggle actuator 68 is pushed further toward the one side of the frame assembly thereby moving the actuator overcenter and to a lockover position at which the bottom surface of the toggle actuator 68 contacts the inwardly directed surface, that is, the one side 35 of the frame assembly 12. At that point, the second pivot axes 70, 72, 74 and 76 are located closer to the frame assembly than the first pivot axes 60, 62, 64 and 66. That position, which is shown in FIG. 5, is referred to as the lockover position for the toggle at which the reactive forces on the toggle links from the internal surfaces of the tube section are effective to hold the toggle actuator into contact with the frame assembly.

The first areas of bearing surfaces of the aligning members are now in contact with the internal corners of the tube section 96, thereby securing the alignment tool between the internal corners of the tube section 96. The stop members 78, 80, 82 and 84 are now removed from their respective slots 86, 88, 90 and 92, as shown in FIG. 4. In addition to properly orienting the alignment tool with respect to the central longitudinal axis of the tube section, the stop members provide a mechanism for bringing a first area of the bearing surfaces on one side of the stop members into contact with the internal surfaces of the first tube section. Therefore, a remaining area of the bearing surfaces extends beyond the flange 98 and the end of the tube section 96.

A toggle release mechanism is connected to the toggle actuator 68. The toggle release mechanism is comprised of a threaded rod 118 having one end connected to an auger spring 120. The other end of the auger spring 120 is rigidly connected to a handle 122. The threaded rod is inserted into a pilot hole 124 of toggle actuator 68, and threaded into threads 126 of toggle actuator 68.

As shown in FIG. 4, a second tube section 128 is moved to a position adjacent to tube section 96 such that the release mechanism extends through the second tube section 128. The internal surfaces of tube section 128 are slid over the exposed second areas of the bearing surfaces of aligning members 28, 30, 32 and 34 which extend beyond the end of the tube section 96. At that point, the tube sections 96 and 128 may be clamped together. The alignment tool 10 has the internal surfaces of tube sections 96 and 128 in alignment such that there is little or no change in elevation in the transition from one tube section to the other. The tube sections 96 and 128 are rigidly connected together by bolts connecting the flange 98 of tube section 96 with the flange 130 of tube sectiol 128. After the tube sections are rigidly connected together, the handle 122 may be moved in a direction to move the toggle actuator 68 away from the one side of the frame assembly 12 thereby moving the aligning members to a position closer the actuator which defines a collapsed configuration of the alignment tool. Alternatively, the handle 122 may be rotated to further thread the threaded rod 118 into the toggle actuator 68 until the threaded rod contacts the inwardly directed surface 35 of frame assembly 12. Continued rotation of the handle 122 will move the toggle actuator 68 along the stationary threaded rod 118 away from the frame assembly 12 thereby releasing the toggle mechanism from the internal corners.

While the present invention has been set forth by a description of the embodiments in considerable detail, it is not intended to restrict or in any way limit the claims to such detail. Additional advantages and modifications will readily appear to those who are skilled in the art. For example, the above described embodiment utilizes an aligning member on the alignment tool for each internal corner of the multilateral tube section. Other configurations are also effective. For example, with a quadrilateral tube section, an alignment tool may have only two opposed aligning members. In addition, stop members may be used in opposed aligning members. Other configurations which are effective to align adjoining internal surfaces may also be used. The invention in its broadest aspects is therefore not limited to the specific details, representative method, and illustrated examples shown and described. Accordingly, departures may be made from such details without departing from the spirit and scope of applicant's general inventive concept.

What is claimed is:

1. An alignment tool for aligning internal surfaces of multilateral tube sections preparatory to the tube sections being joined, each of the multilateral tube section shaving a number of internal surfaces forming a like number of included corners therebetween, the alignment tool comprising:
    a frame;
    a toggle actuator;
    at least two toggle links, each of said toggle links having one end pivotally connected to said toggle actuator at a first pivot point; and
    at least two aligning members slidably mounted on one side of said frame, each of said aligning members being pivotally connected to an opposite end of one of said toggle links at a second pivot point, said aligning members adapted to move in a first direction toward the internal surfaces of the multilateral tube section in response to motion of said toggle actuator, each of said aligning members having two outwardly facing nonparallel bearing surface areas oblique with said first direction and adapted to contact two of the internal surface forming one of the included corners;

2. The alignment tool of claim 1 wherein said aligning members move in said first direction in response to said toggle actuator moving toward said frame and said aligning members move in an opposite second direction in response to said toggle actuator away from said frame.

3. The alignment tool of claim 2 wherein said aligning members are moved to a maximum displacement from said toggle actuator in response to said toggle actuator moving said aligning members in said first direction to a position where said first and second pivot points lie in a common plane approximately parallel to said one of said frame.

4. The alignment tool of claim 3 wherein said toggle actuator contacts said one side of said frame in response to the movement of said toggle actuator and said one ends of said toggle links toward said one side of said frame to a position where said first pivot points are closer to said one side of said frame than said second pivot points.

5. The alignment tool of claim 4 wherein said aligning members are moved to a minimum distance from said toggle actuator in response to said toggle actuator moving said one ends of said toggle links away from said one side of said frame to a position where said first pivot points are further removed from said one side of said frame than said second pivot points.

6. The alignment tool of claim 5 wherein said toggle actuator further comprises a release means connected to said toggle actuator for moving said toggle actuator and said opposite ends of said toggle links away from said one side of said frame.

7. The alignment tool of claim 6 wherein at least one of said aligning members further comprising a stop member removably mounted to said one of said aligning members and said stop member is substantially perpendicular to said bearing surface areas of said one of said aligning members.

8. The apparatus of claim 7 wherein said one of said aligning members further comprising:
    a slot located in said bearing surface areas of said one of said aligning members, said slot receiving said stop member; and
    detent means adjacent to and contiguous with said slot for applying a holding force against said stop member when said stop member is mounted in said slot.

9. The alignment tool of claim 6 wherein said release means further comprises:
a threaded hole in said toggle actuator; and
a threaded rod threadedly engaged in said threaded hole and contacting said frame, whereby rotation of said threaded rod moves said toggle actuator and said opposite ends of said toggle links away from one side of said frame.

10. The alignment tool of claim 1 further comprising four aligning members and four toggle links.

* * * * *